United States Patent
Lee et al.

(10) Patent No.: US 7,158,516 B2
(45) Date of Patent: Jan. 2, 2007

(54) METHOD AND APPARATUS FOR PERFORMING MULTI CONNECTIONS AT POINT-TO-POINT PROTOCOL

(75) Inventors: Ho-Geun Lee, Seoul (KR); In-Ho You, Seoul (KR); Shin-Hyun Yang, Seoul (KR)

(73) Assignee: UTStarcom, Inc., Alameda, CA (US)

( * ) Notice: Subject to any disclaimer, the term of this patent is extended or adjusted under 35 U.S.C. 154(b) by 804 days.

(21) Appl. No.: 09/847,569

(22) Filed: May 2, 2001

(65) Prior Publication Data

US 2001/0048693 A1    Dec. 6, 2001

(30) Foreign Application Priority Data

| Jun. 3, 2000 | (KR) | ............................. 2000-30625 |
| Jun. 26, 2000 | (KR) | ............................. 2000-35273 |
| Jun. 26, 2000 | (KR) | ............................. 2000-35276 |

(51) Int. Cl.
*H04L 12/28* (2006.01)
*H04J 1/16* (2006.01)

(52) U.S. Cl. ...................... 370/392; 370/469; 709/227

(58) Field of Classification Search ................ 370/465, 370/469, 392, 431, 335; 709/227, 228
See application file for complete search history.

(56) References Cited

U.S. PATENT DOCUMENTS

| 6,032,193 | A | * | 2/2000 | Sullivan ...................... 370/355 |
| 6,137,791 | A | | 10/2000 | Frid et al. .................... 370/352 |
| 6,160,808 | A | * | 12/2000 | Maurya ...................... 370/389 |
| 6,202,094 | B1 | * | 3/2001 | Grosser et al. ............. 370/465 |
| 6,370,118 | B1 | * | 4/2002 | Lioy et al. .................. 370/235 |
| 6,466,574 | B1 | * | 10/2002 | Fujisaki et al. ............. 370/356 |
| 6,522,880 | B1 | * | 2/2003 | Verma et al. ............... 455/436 |
| 6,577,644 | B1 | * | 6/2003 | Chuah et al. ............... 370/466 |
| 6,590,879 | B1 | * | 7/2003 | Huang et al. ............... 370/331 |
| 6,628,671 | B1 | * | 9/2003 | Dynarski et al. ........... 370/469 |
| 6,738,379 | B1 | * | 5/2004 | Balazinski et al. ......... 370/394 |
| 6,778,495 | B1 | * | 8/2004 | Blair .......................... 370/230 |

* cited by examiner

*Primary Examiner*—Andrew C. Lee
(74) *Attorney, Agent, or Firm*—McDonnell Boehnen Hulbert & Berghoff LLP (57) ABSTRACT

Methods for performing multi connections at point-to-point protocol are disclosed. One method for transmitting a datagram in an apparatus having point-to-point protocol sessions which transmits datagrams received from a physical layer of a communication network to a network layer, includes the steps of: a) establishing a least two PPP sessions; b) classifying the datagrams received from a physical layer based on the PPP session and transmitting the datagram to a corresponding PPP session; c) processing the datagram received by the PPP in the PPP session; and d) selecting one of the processed datagrams and transmitting the selected datagram to the network layer.

8 Claims, 9 Drawing Sheets

METHOD AND APPARATUS FOR PERFORMING MULTI CONNECTIONS AT POINT-TO-POINT PROTOCOL

FIELD OF THE INVENTION

The present invention relates to amobile communication system; and, more particularly, to a method and apparatus for performing one to multi (1:N) connections based on point-to-point protocol in a mobile communication system.

DESCRIPTION OF THE PRIOR ART

Figure 1:
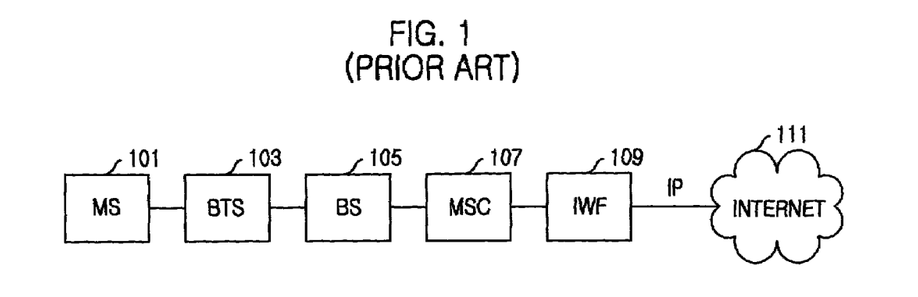
FIG. 1 is a block diagram of a conventional IMT-2000 system.

FIG. 1 is a block diagram of a conventional IMT-2000 system.

A soft handoff is an important one of advantages in a conventional international mobile telecommunication (IMT)-2000 system as illustrated in FIG. 1. The soft handoff has advantages in mobility, quality of service and reliability of call.

Nowadays, in two International standardization meeting groups, a third generation partnership projects (3GPP) and a 3GPP2, a change of the IMT-2000 network to an all Internet protocol (All IP) network and standards for the All IP network has been discussed. The All IP network is a mobile communication network based on an Internet protocol. The All IP has been developed based on a conventional mobile IP and VOIP (Voice over IP).

In the mobile IP, a two-tier type address is adopted as an address translation method in the IP layer. The two-tier type address includes a care-of address (COA) used for a path setup and a data transmission and a home address (which has a fixed IP address) used for identification of a mobile host and a session connection.

The mobile host has a peculiar Internet address corresponding to a host name as a home address, which is similar to the conventional fixed host, and also has the COA which indicates a real location of the packet and is varied when the mobile host moves to another network.

Figure 2:
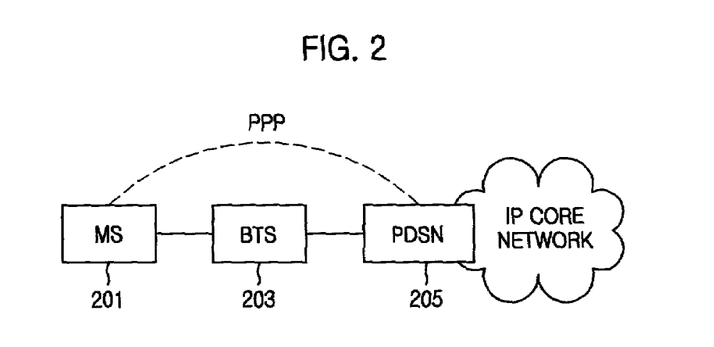
FIG. 2 is a diagram illustrating a point-to-point protocol connection between a MS and a PDSN in All IP network.
Figure 3:
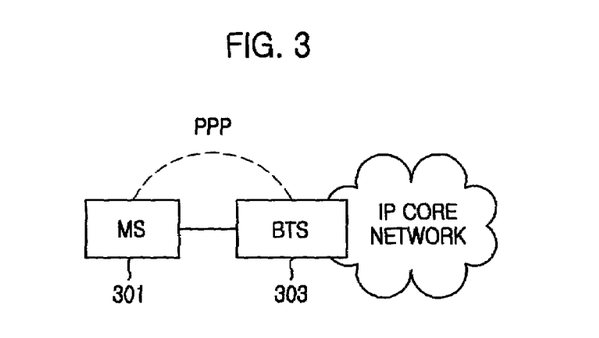
FIG. 3 is a diagram illustrating a point-to-point protocol connection between a MS and a BTS in All IP network.

FIG. 2 is a diagram illustrating a point-to-point protocol connection between a MS and a PDSN (Packet Data Service Node) in All IP network, and FIG. 3 is a diagram illustrating a point-to-point protocol connection between a MS and a BTS in All IP network.

As shown in FIG. 2, a conventional wireless IP is introduced in order to apply the IMT-2000 system to the All IP network. A point-to-point protocol (PPP) connection between the mobile station (MS) and the PDSN is established.

According to the definitions by an International Engineering Task Force (IETF), the PPP can support only one to one (1:1) connection. In other words, the PPP cannot support the soft handoff which needs one to multiple (1:N) connection. Accordingly, in order to change the conventional IMT-2000 network to the All IP network along with the soft handoff, the PPP is required to be enhanced.

Especially, as shown in FIG. 3, in case that PPP peer to the MS is downed to the BTS in the All IP network, since the handoff is performed more frequently, the PPP techniques should be enhanced to perform one to multiple connection in order to support the soft handoff.

Figure 4:
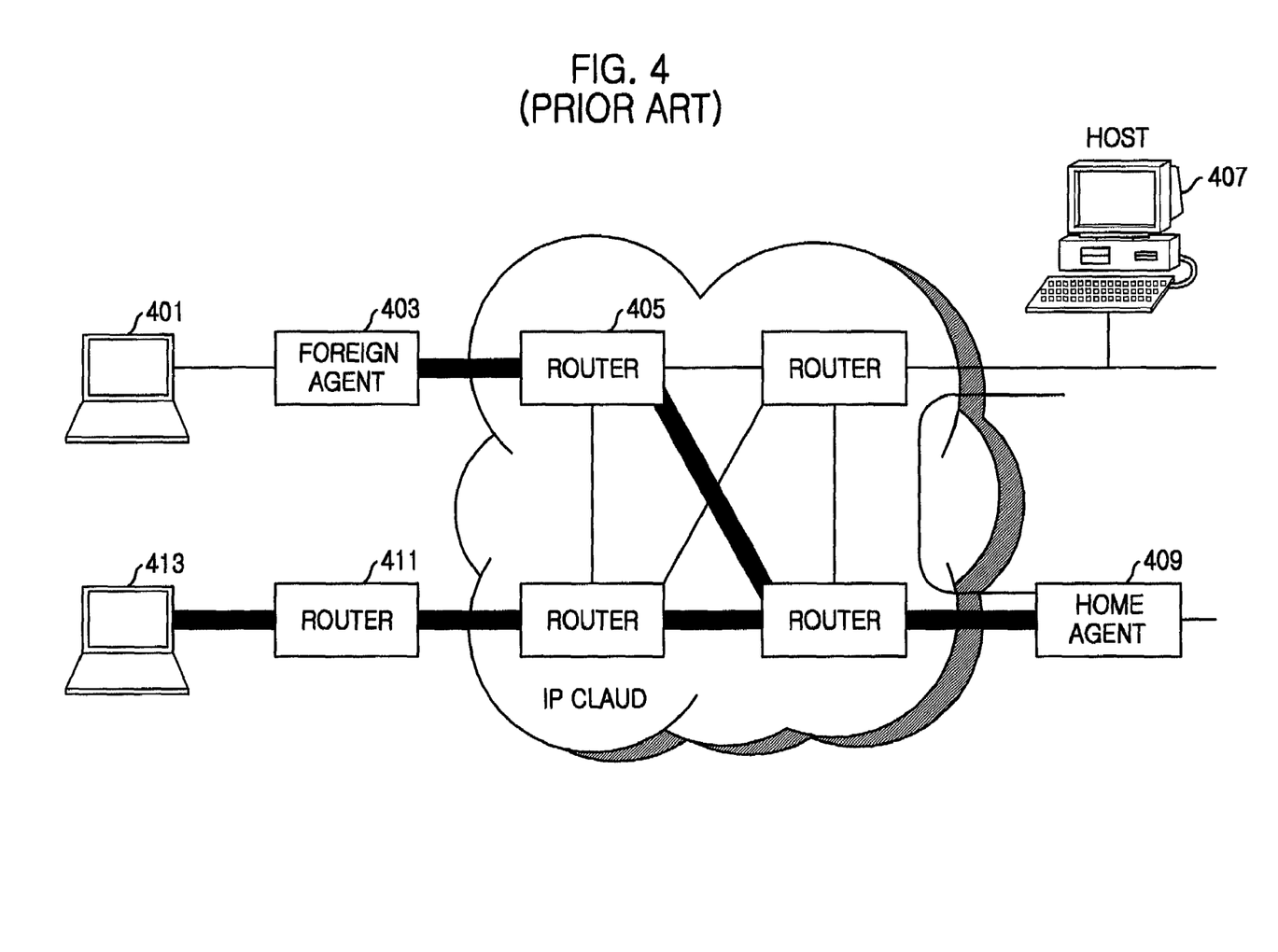
FIG. 4 is a diagram showing a packet routing to a mobile node under a conventional foreign agent.

Up to now, the IETF defines a mobile node, a home agent and a foreign agent for a mobile IP service. Referring to FIG. 4, a packet routing to the mobile node in the conventional foreign agent is described and a reference numeral 405 denotes an IP cloud.

Referring to FIG. 4, a mobile node 407 is a host supporting a mobility service, the mobile node can move among networks without changing its IP address and continuously communicate with another node in the Internet by using its fixed IP address.

A home agent, which belongs to a home network and manages a current COA and a home address of the mobile node, receives a datagram from the host 407 and performs a tunneling of the received datagram through the IP cloud 405 and the router 411, thereby transmitting the datagram to the mobile station 413. In other words, the home agent 409 performs the tunneling function of the datagram in order to transmit the datagram of the mobile node to the network to which the mobile node belongs, when the mobile node is an external network.

The foreign agent 403 provides the COA when the host 407, which is a mobile node, belongs to an external network. The foreign agent 403 can provide its IP address as the COA or a temporary IP address. Accordingly, the foreign agent 403 provides a routing service to a mobile node when the mobile node moves to its service area, performs a detunneling of the tunneled datagram received from the home agent and transmits the detunneled datagram to the mobile node. The foreign agent 403 provides the datagram from the mobile node with the conventional gateway service.

As shown in FIG. 4, if the mobile terminal 401 is serviced from not the home agent but the foreign agent 403, the host transmits the datagram to the home agent 409 by misrecognizing that the mobile terminal 401 is located in the home agent as the same as the conventional network. The home agent 40.9 performs the tunneling of the datagram and transmits the datagram to the foreign agent 403, and the foreign agent 403 does the datagram to the mobile terminal 401.

Figure 5:
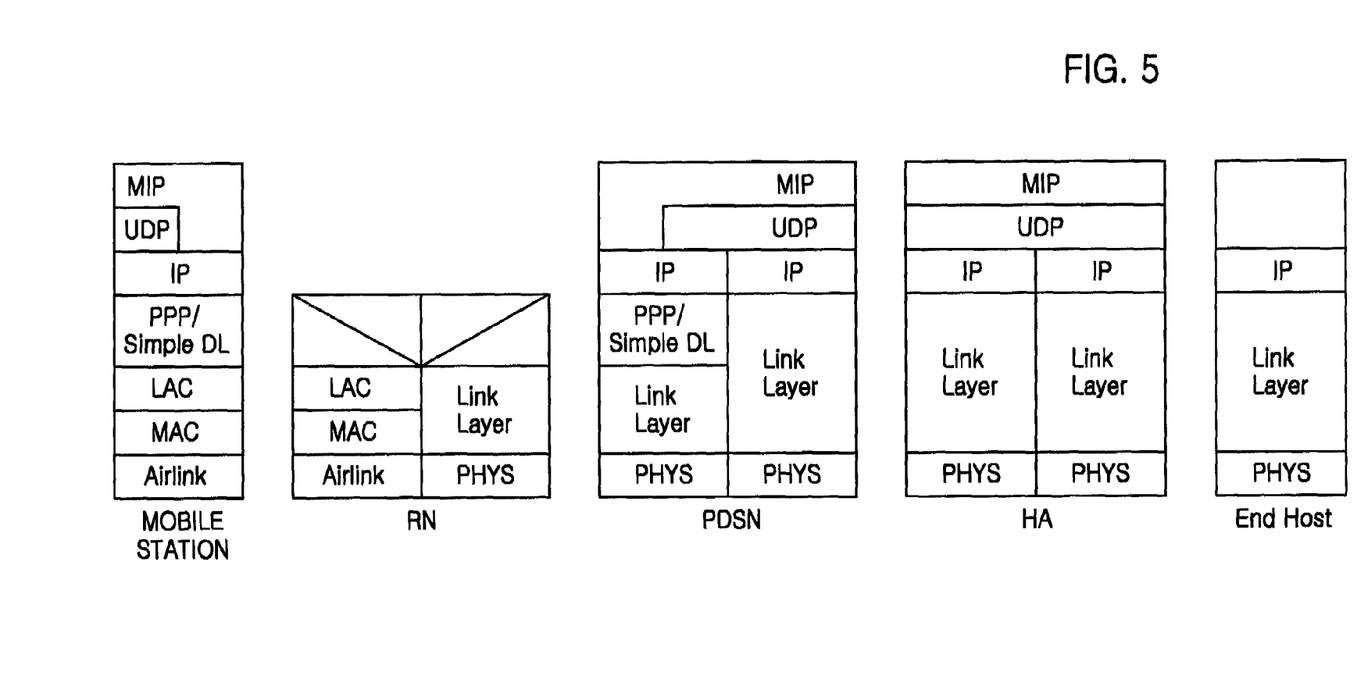
FIG. 5 is a diagram of protocol stacks in a conventional mobile IP.

Protocol stacks in a conventional mobile IP are illustrated in FIG. 5, and state processing procedure of the conventional PPP will be described with reference to FIG. 6.

Figure 6:
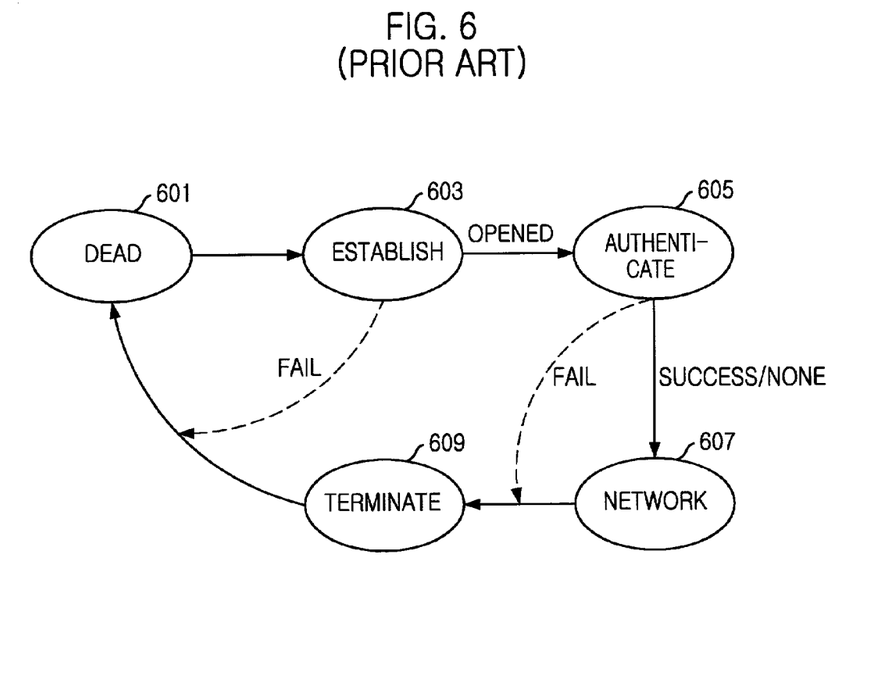
FIG. 6 is a state diagram of a conventional point-to-point protocol (PPP)

FIG. 6 is a state diagram of a conventional point-to-point protocol.

Referring to FIG. 6, if a foreign event, e.g., a carrier detector or a network manager, indicates that a physical layer can be used, a point-to-point protocol (PPP) starts a link establishment state 603, if not, stay at a dead state 601.

At the link establishment state 603, if the link establishment state is fail, the PPP is shifted to the dead state 601, if the link establishment state is success, the PPP performs the link establishment based on a link control protocol and then the link is opened.

Next, the PPP can process to an authentication state 605. The authentication state is an optional state, a peer performs the authentication to the link based on a predetermined protocol. If the authenticate is success or the authentication state does not exist, the PPP processes to a network state 607 which is performed by a network control protocol.

If the network state 607 is completed or the authentication is fail at the authentication state 605, the PPP processes to a termination state 609. In case that the PPP is shifted to the termination state 609 due to the fail of the authentication, the network layer protocol is not established and then terminated. Then, the PPP processes to the dead state 601 and stays at the dead state until any event occurs.

As mentioned above, the conventional PPP passes through the link establishment protocol, the authentication state and the network state and then transmits network datagrams. Each of the network datagram is capsulized and decapsulized during transmission of the datagram.

However, the conventional PPP technique has been developed without regarding mobile environment, e.g., a mobile station, if the conventional PPP technique is applied to the mobile station, there are some problems. Most important one is the problem in that a soft handoff cannot be supported.

The mobile station and the foreign agent are connected based on the PPP and then datagrams are transmitted through the PPP connection. The PPP supports only one to one (1:1) connection not one to multi (1:N) connection. In other words, since each peer of the PPP is the mobile station and the foreign agent and only one connection between the peers can be supported, the soft handoff, which is performed between the foreign agents, cannot be supported. Accordingly, in order to support the soft handoff, a method for supporting one to multi connection is necessary.

SUMMARY OF THE INVENTION

Therefore, it is an object of the present invention to provide a method for supporting one to multi (1:N) connection in PPP connection.

In accordance with an aspect of the present invention, there is provided a method for transmitting a datagram in an apparatus having point-to-point protocol sessions which transmits datagrams received from a physical layer of a communication network to a network layer, the method comprising the steps of: a) establishing a least two PPP sessions; b) classifying the datagrams received from a physical layer based on the PPP session and transmitting the datagram to a corresponding PPP session; c) processing the datagram received by the PPP in the PPP session; and d) selecting one of the processed datagrams and transmitting the selected datagram to the network layer.

In accordance with another aspect of the present invention, there is provided a computer readable recording media storing instructions for executing a method for transmitting a datagram in an apparatus having point-to-point protocol sessions which transmits datagrams received from a physical layer of a communication network to a network layer, the method comprising the steps of: a) establishing a least two PPP sessions; b) classifying the datagrams received from a physical layer based on the PPP session and transmitting the datagram to a corresponding PPP session; c) processing the datagram received by the PPP in the PPP session; and d) selecting one of the processed datagrams and transmitting the selected datagram to the network layer.

In accordance with further another aspect of the present invention, there is provided an apparatus for transmitting a datagram, the apparatus having point-to-point protocol (PPP) sessions which transmits datagrams received from a physical layer of a communication network to a network layer, comprising: PPP session means block a plurality of PPP sessions; a first management plane located on an upper layer of the PPP sessions, for selecting a corresponding one of the datagrams received from the PPP sessions and transmitting the selected datagram to the network layer; and a second management plane located on an under layer of the PPP sessions, for classifying datagrams received from a physical layer and transmitting each of the datagrams to the PPP session corresponding to the datagram, respectively.

In accordance with still another aspect of the present invention, there is provided a multi connection method applied to an apparatus for multi connections in a point-to-point protocol based apparatus, the method comprising the steps of: a) shifting a dead state to an establishment state based on a connection request from a user; b) performing a link establishment by using a link control protocol at the establishment state, if the link establishment is success, shifting to an authentication state, if not, shifting to the dead state; c) performing a transmission of an upper layer message based on a network control protocol at a network state, if the transmission is success, shifting to a termination state; d) if a new connection request is received at the network state, driving sub-states, thereby performing a multi processing, so that one to multi (1:N) connection can be established; and e) performing disconnections by a number of the multi connection at the termination state and shifting to the dead state.

In accordance with still further aspect of the present invention, there is provided a computer readable recording media storing instructions for executing a method for a multi connection applied to an apparatus for multi connections by using a multi processing in a point-to-point protocol (PPP), the method comprising the steps of: a) shifting a dead state to an establishment state based on a connection request from a user; b) performing a link establishment by using a link control protocol at the establishment state, if the link establishment is success, shifting to an authentication state, if not, shifting to the dead state; c) performing a transmission of an upper layer message based on a network control protocol at a network state, if the transmission is success, shifting to a termination state; d) if a new connection request is received at the network state, driving sub-states, thereby performing a multi processing, so that one to multi (1:N) connection can be established; and e) performing disconnections by a number of the multi connection at the termination state and shifting to the dead state.

In accordance with still further aspect of the present invention, there is provided a method for performing multi connections applied to an apparatus for multi connection by using a multi processing in a point-to-point protocol (PPP), the method comprising the steps of: a) shifting a dead state to an establishment state based on a connection request from a user; b) performing a link establishment by using a link control protocol at the establishment state, if a link establish is success, shifting to a network state, if not, shifting to the dead state; c) performing a transmission of an upper layer message based on a network control protocol at a network state, if the transmission is success, shifting to a termination state; d) if a new connection request is received at the network state, shifting to the establishment state and establishing a new link based on a link control protocol, thereby performing a multi processing, so that one to multi (1:N) connection can be established; and e) performing disconnections by a number of the multi connection at the termination state and shifting to the dead state.

In accordance with still further aspect of the present invention, there is provided a computer readable recording media storing instructions for executing a method for performing multi connections applied to an apparatus for multi connection by using a multi processing in a point-to-point protocol (PPP), the method comprising the steps of: a) shifting a dead state to an establishment state based on a connection request from a user; b) performing a link establishment by using a link control protocol at the establishment state, if a link establish is success, shifting to a network state, if not, shifting to the dead state; c) performing a transmission of an upper layer message based on a network control protocol at a network state, if the transmission is success, shifting to a termination state; d) if a new connection request is received at the network state, shifting to the establishment state and establishing a new link based on a link control protocol, thereby performing a multi processing, so that one to multi (1:N) connection can be established; and e) performing disconnections by a number of the multi connection at the termination state and shifting to the dead state.

BRIEF DESCRIPTION OF THE DRAWINGS

Other objects and aspects of the invention will become apparent from the following description of the embodiments with reference to the accompanying drawings, in which.

DETAILED DESCRIPTION OF THE INVENTION

Hereinafter, embodiments of the present invention will be described in detail referring to the accompanying drawings.

Embodiment 1

Hereinafter, one embodiment of the present invention will be described with reference to FIGS. 7 to 11.

Figure 7:
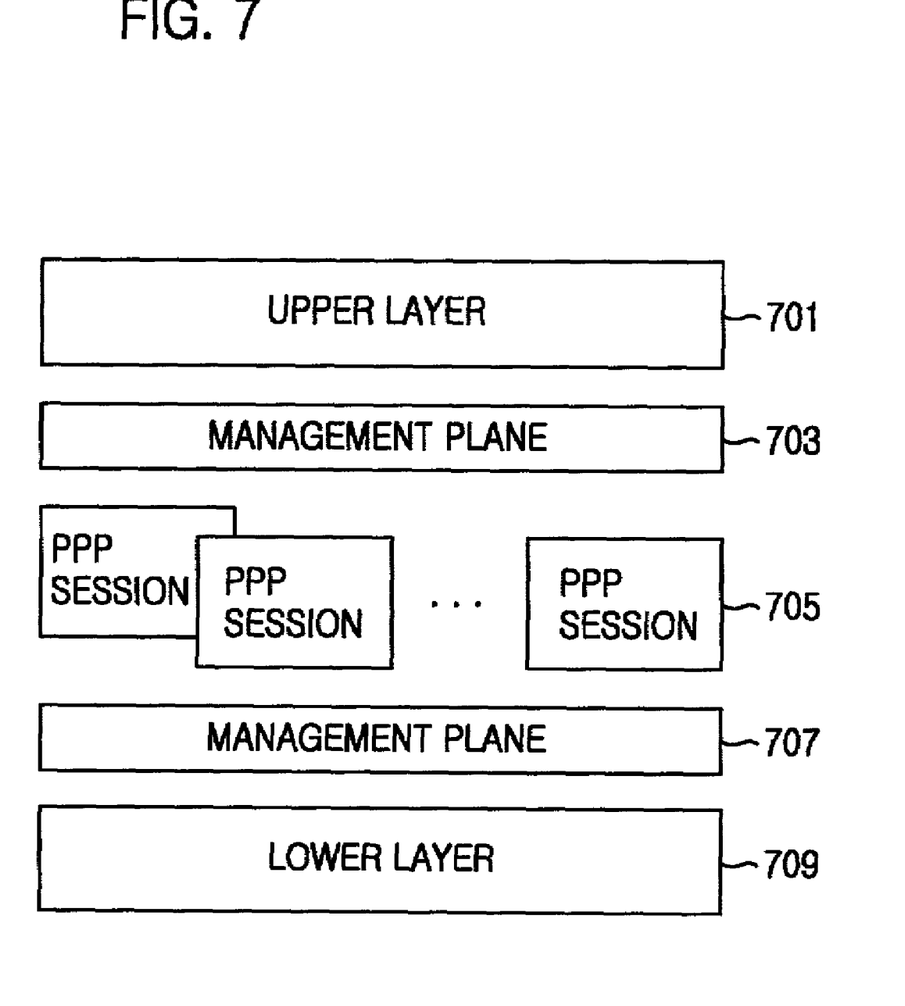
FIG. 7 is a diagram illustrating PPP stacks of a datagram transmitter having an enhanced PPP.

Referring to FIG. 7, a datagram transmitter in accordance with the present invention includes a first management plane 703, a PPP session block 705 and a second management plane 707.

The PPP session block 705 includes a plurality of PPP sessions. Each PPP session receives datagrams when a predetermined event indicates that a physical layer 709, a lower layer of the PPP session, can be used, establishes a link and transmits the datagrams to a network layer, an upper layer 701 the PPP session. The PPP session decapsulizes the datagram to be transmitted.

Figure 10:
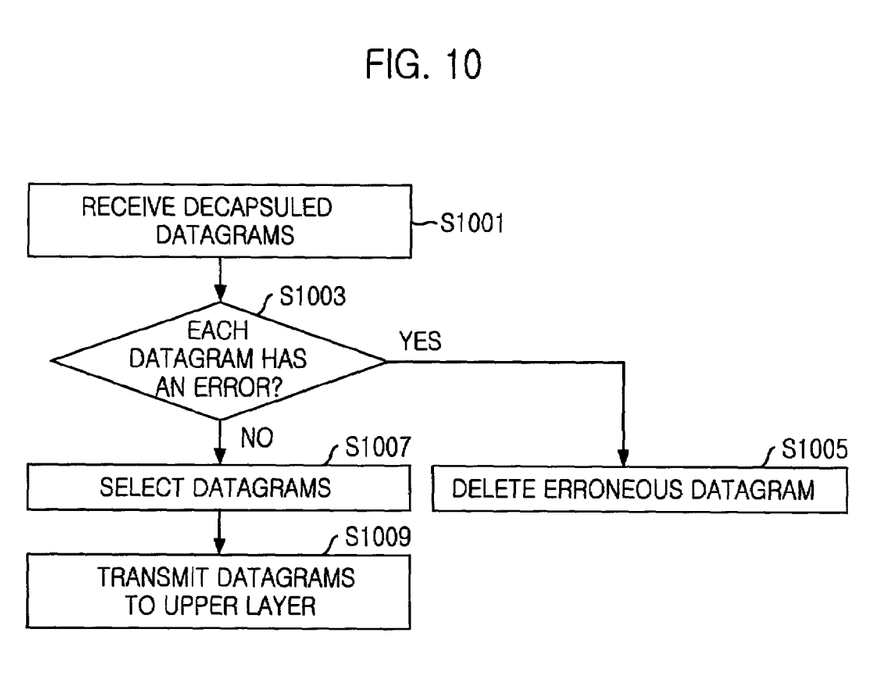
FIGS. 10 and 11 are flow charts illustrating datagram transmitting methods applied to the datagram transmitter in FIG. 7.

The first management plane 703 is located above the PPP session block 705 and selects one out of the decapulized datagrams from the PPP session block 705 and transmits the selected datagram to the upper layer 701, the network layer. The first management plane 703 receives the decapsulized datagrams at step S1001, compares the received datagrams with each other at step S1003. If there is a datagram having an error, the first management plane 703 deletes the datagram having an error at step S1005, selects one of the others based on a predetermined rule, for example, a network control protocol at step S1007, and transmits the selected datagram to the upper layer 701, the network layer.

Figure 11:
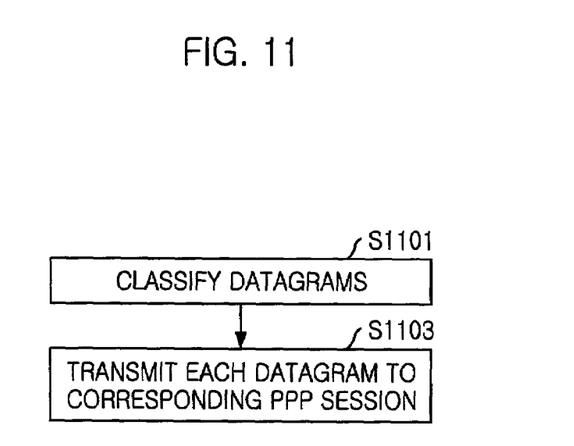

The second management plane 707 is located below the PPP session block 705, receives the datagrams from the lower layer 709, e.g., the physical layer, classifies the datagrams and transmits each of the datagrams to a corresponding PPP session in the PPP session block 705. In other words, the second management plane 707 does not transmit the datagrams to the PPP session block 705 in disorder, classifies the datagrams based on a value of the PPP session at step S1101 and transmits the datagram to the corresponding PPP session at step S1103.

Figure 8:
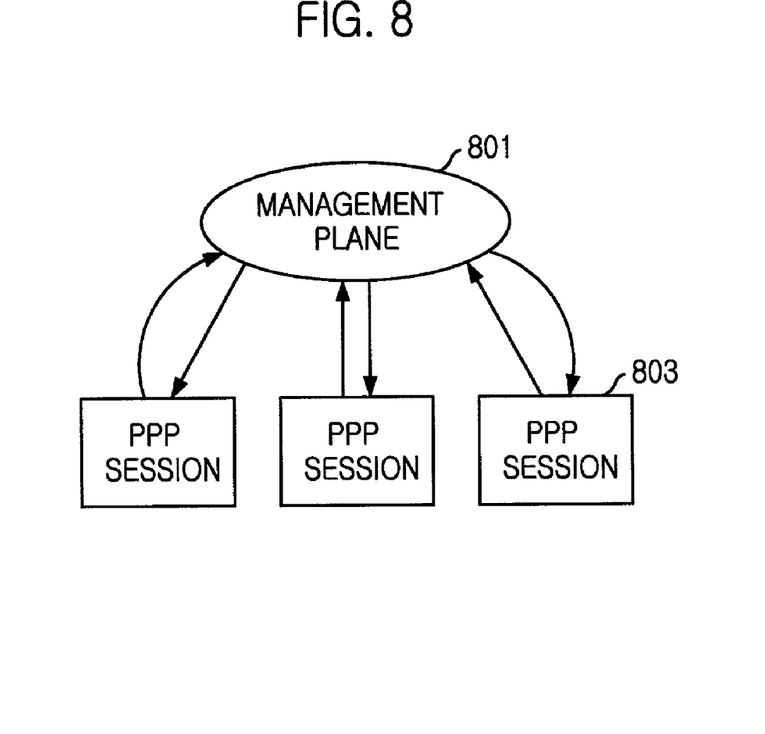
FIGS. 8 and 9 are diagrams illustrating operations of diagram transmitters in FIG. 7.
Figure 9:
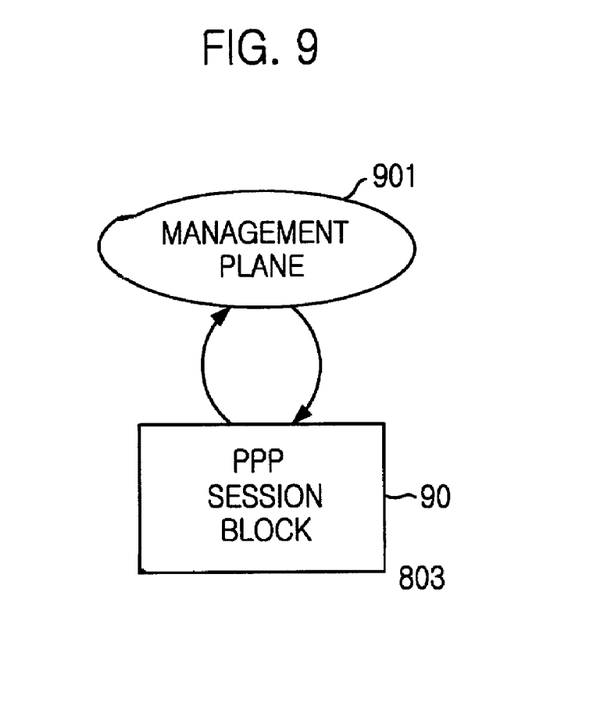

Even though the management plane 801 or 901 interworks with each PPP session 803 included in the PPP session block, the management planes 801 or 901 looks like interworking with a PPP session block 903. Since the PPP session block includes the multiple PPP sessions, one to multi connections can be performed when the datagrams are transmitted by the PPP. Also, by locating the management planes upper and below the multiple PPP sessions, the multiple PPP sessions can be easily managed.

Embodiment 2

Figure 12:
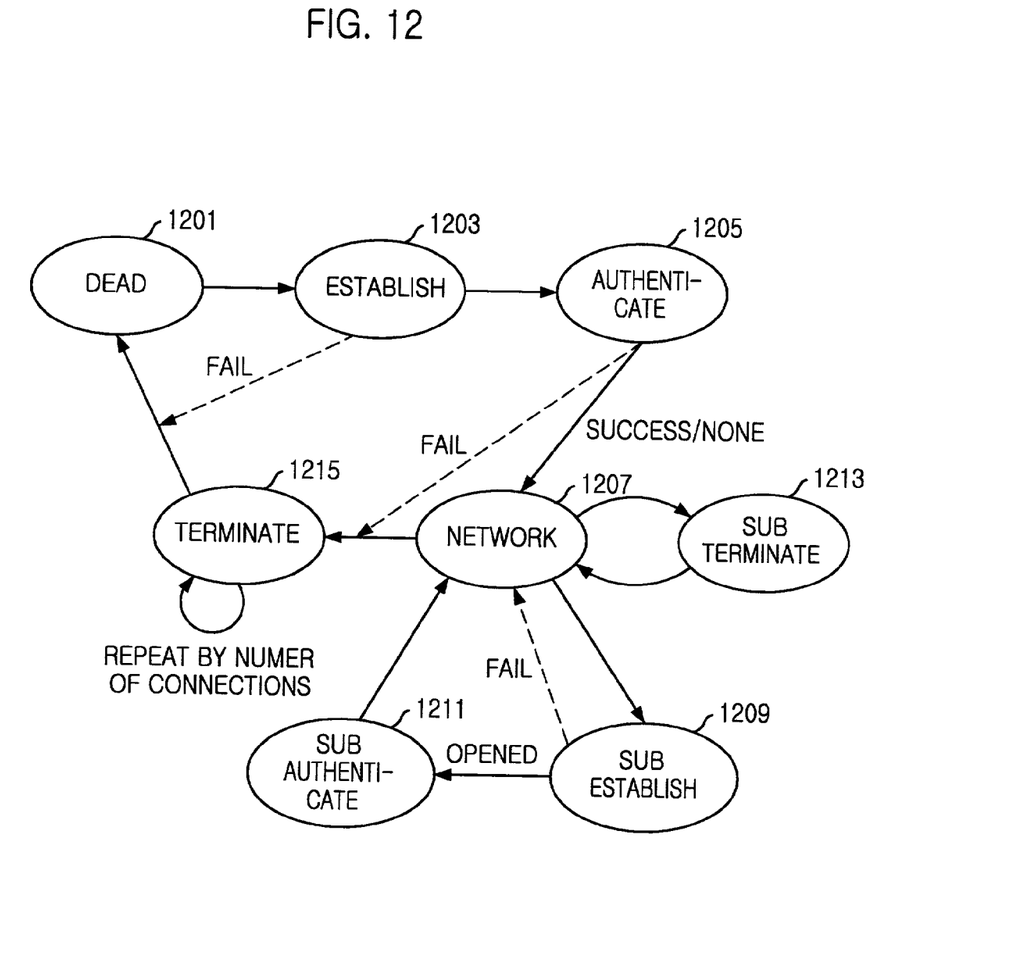
FIG. 12 is a state diagram illustrating states of point-to-point protocol in accordance with another embodiment of the present invention.

FIG. 12 is a state diagram illustrating states of a point-to-point protocol in accordance with another embodiment of the present invention.

Referring to FIG. 12, in this embodiment, in order to solve a problem in that one to multi connections cannot be performed, sub states are drived by multi processing and multi connections can be established. In other words, a point-to-point protocol (PPP) in accordance with the present invention includes a dead state 1201, an establishment state 1203, an authentication state 1205, a network state 1207 and a termination state. The network state 1207 includes a sub establishment state 1209, a sub authentication state 1211 and a sub termination state 1213.

A PPP link is connected and controlled in the establishment state, it is authenticated that the PPP link can be connected in authentication state 1205. In the network state, a network connection is managed under that circumstance that the PPP link connection has been completed, if a new connection request is received, a sub establishment state and a sub authentication state similar to the established state 1203 and the authentication state 1205 are operated and multi-processed. If a connection release request is received in case of the multi connection, the process comes to a sub termination state and the connection is released. In the termination state 1215, the connection is released and the disconnection is repeated by a number of the connections.

Multi connection procedure will be described in more detail.

The dead state is shifted to the establishment state 1203 when the connection request is received from a user.

At the establishment state 1203, a link connection is performed by a link control protocol. If the link connection is fail, the connection is not established and the process is shifted to the dead state 1201. If the link connection is success, the link is opened and the process is shifted to the authentication state 1205.

At the authentication state 1205, the connection request is authenticated. If the PPP connection is possible, the process is shifted to the network state 1207, and if not, the process is shifted to the termination state 1215. The authentication state is an optional state.

At the network state 1207, the datagram is transmitted to the upper layers by the network control protocol, and the PPP connection is maintained and managed.

If a new connection is received at the network state 1207, a sub state is driven, thereby performing multi processing.

In other words, a new link is established by the link control protocol at the sub establishment state 1209. If the link establishment is fail, the process is shifted to the network state 1207 without establishing of the link connection, and if the link establishment is success, the link is opened and the process is shifted to the sub authentication state 1211.

At the sub authentication state 1211, it is authenticated that the PPP connection of the new connection request is possible and the process is shifted to the network state 1207. The sub authentication state 1211 is an optional state.

If a connection release request is received at the network state in case of multi connections, a sub termination state is operated and the PPP connection is released.

If the network state 1207 is terminated, the process is shifted to the termination state after releasing the connection. At the termination state, the PPP connections are disconnected by the number of multi connections, and then the process is shifted to and stayed on the dead state 1201 until an event is received.

Multi processing by a time scheduler establishes sub states, thereby being capable of multi connections.

In the present invention, the network state of the main state includes another PPP session in which the sub state has a sub establishment state and a sub authentication state, thereby being possible of the multi processing. The multi processing is operated by the time scheduler and the termination state of the main state is repeated by the number of the multi connections. According to the processing, one to multi connection can be performed by using the PPP supporting one to one connection, thereby supporting the soft handoff.

Embodiment 3

Figure 13:
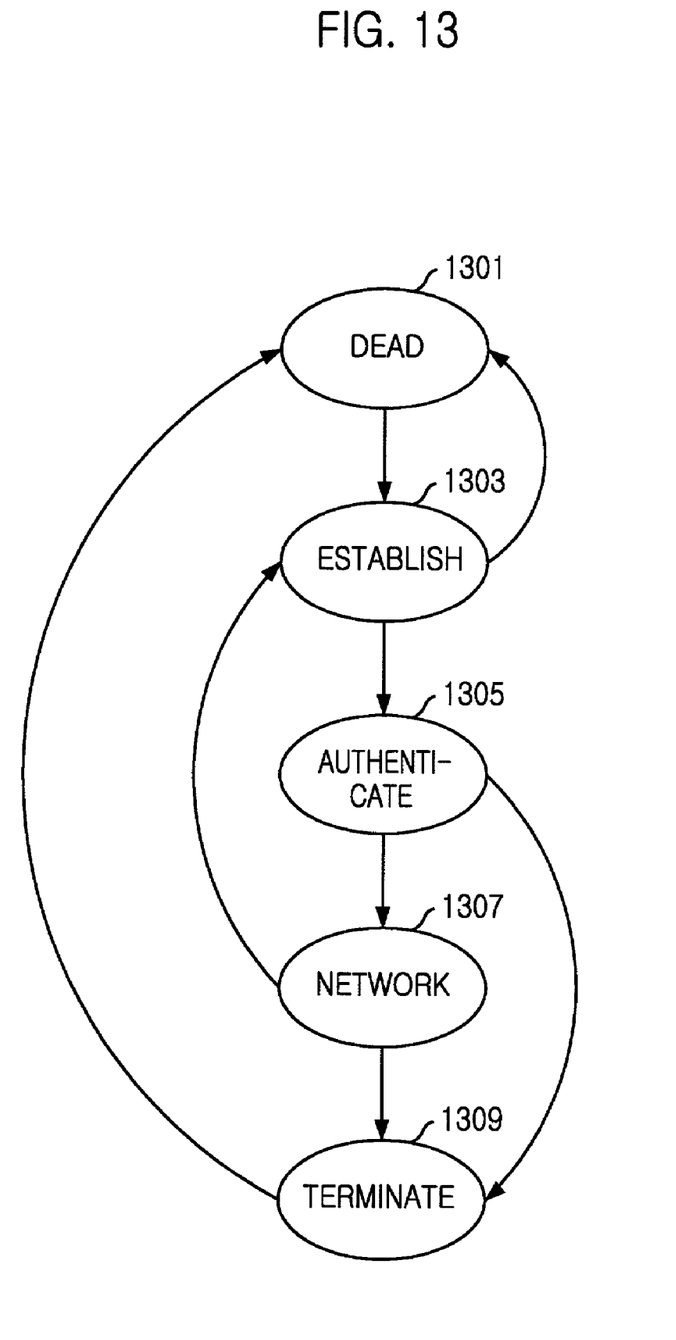
FIG. 13 is a state diagram illustrating states of point-to-point protocol in accordance with further another embodiment of the present invention.

FIG. 13 is a state diagram illustrating states of a point-to-point protocol in accordance with further another embodiment of the present invention.

If a connection request is received from a user at a dead state 1301, the process is shifted to an establishment state 1303.

At the establishment state 1303, a link establishment is performed by a link control protocol. If the link establishment is success, the link is opened and the process is shifted to an authentication state 1305, and if not, the process is shifted to the dead state 1301.

At the authentication state 1305, the authentication to the link connection is performed. If the authentication is success, the process is shifted to a network state 1307, and if not, the link connection is not established and the process is shifted to the authentication state 1305.

At network state 1307, a upper layer message is transmitted by a network control protocol. After the network state 1307 is completed, the connection is released and the process is shifted to a termination state 1309.

If a new connection request is received at the network state 1307, the process is shifted to the establishment state 1303 and then the process is repeated from an establishment of a new link.

Then, the process is shifted from the termination state 1309 to the dead state 1301 and stayed at the dead state 1301.

The present invention can be applied to a soft handoff method in an All-IP based IMT-2000 in which the base transceiver station is an end of the PPP. In other words, in case that the BTS is a PPP peer of the mobile terminal in the All IP network, the soft handoff can be supported based on the present invention.

Using the present invention, the soft handoff in the All-IP network can be easily realized, thereby increasing a quality of the communication.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting a datagram in an apparatus having point-to-point protocol (PPP) sessions which transmits datagrams received from a physical layer of a communication network to a network layer, the method of comprising the steps of:

at a mobile station (MS), establishing at least two active PPP sessions between the MS and at least one network entity communicatively coupled to the communication network, wherein the active PPP sessions are used for redundant transmission of datagrams between the MS and the at least one network entity;

classifying the datagrams received from the physical layer according to their association with one of the active PPP sessions and transmitting each datagram to the corresponding active PPP session;

processing each datagram in the associated active PPP session; and selecting one of the processed datagrams and transmitting the selected datagram to the network layer protocol.

2. The method as recited in claim 1, wherein the step of processing the datagram includes the step of decapsulizing the datagram received from the physical layer.

3. The method as recited in claim 2, wherein the step of selecting one of the processed datagrams includes the steps of:

comparing the decapsulized datagrams; and deleting the datagram having an error.

4. A computer readable recording media storing instructions for causing a mobile station (MS) to perform the steps of:

establishing at least two active PPP sessions between the MS and at least one network entity communicatively coupled to a communication network, wherein the active PPP sessions are used for redundant transmission of datagrams between the MS and the at least one network entity;

classifying the datagrams received from a physical layer of the MS according to their association with one of the active PPP sessions and transmitting each datagram to the corresponding active PPP session in the MS;

processing each datagram in the associated active PPP session; and selecting one of the processed datagrams and transmitting the selected datagram to a network layer of the MS.

5. A mobile station (MS) apparatus for transmitting a datagram, the apparatus having point-to-point protocol (PPP) sessions which transmit datagrams received from a physical layer of a communication network to a network layer, comprising:

PPP session means having a plurality of active PPP sessions between the MS and at least one network entity communicatively coupled to the communication network, wherein the active PPP sessions are used for redundant transmission of datagrams between the MS and the at least one network entity, and wherein said plurality of active PPP sessions are established during a handoff process;

a first management plane located on an upper layer of the active PPP sessions, for selecting a corresponding one of the datagrams received from the active PPP sessions and transmitting the selected datagram to the network layer of the MS; and a second management plane located on an under layer of the active PPP sessions, for classifying datagrams received from the physical layer of the MS according to their association with one of the active PPP sessions and transmitting each of the datagrams to the active PPP session corresponding to the datagram, respectively.

6. The apparatus as recited in claim 5, wherein the PPP session means decapsulizes the datagram received from the second management plane.

7. The apparatus as recited in claim 6, wherein the first management plane compares decapsulized datagrams and delete the datagram having an error.

8. The method as recited in claim 1, wherein the network entity is a packet data serving node (PDSN).

* * * * *